Nov. 22, 1949 W. J. WICKLESS 2,488,842
TIME DELAY RELAY
Filed July 18, 1946
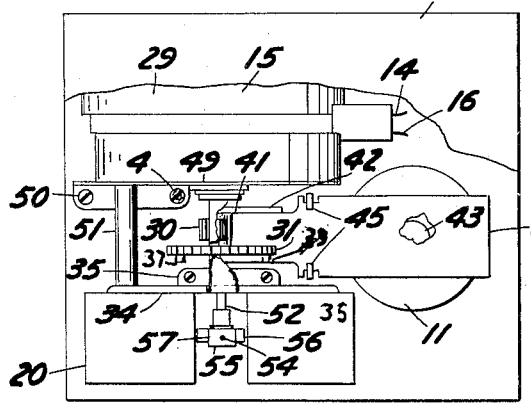
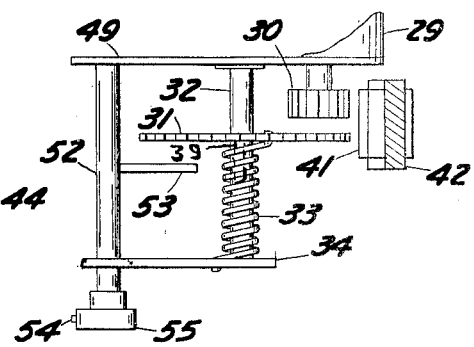
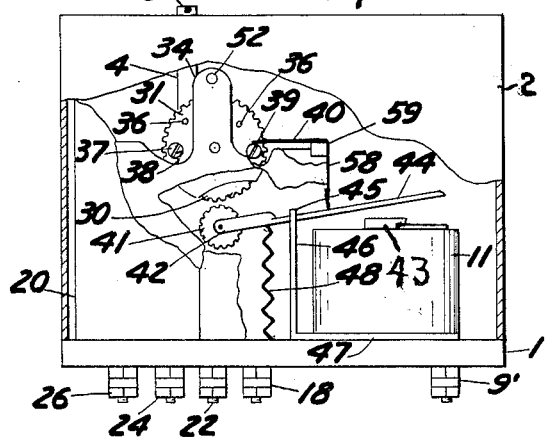
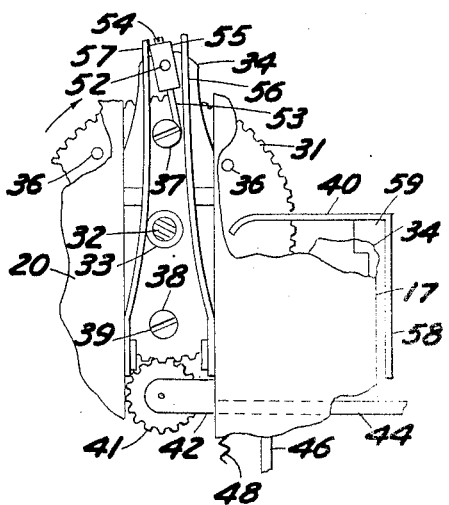
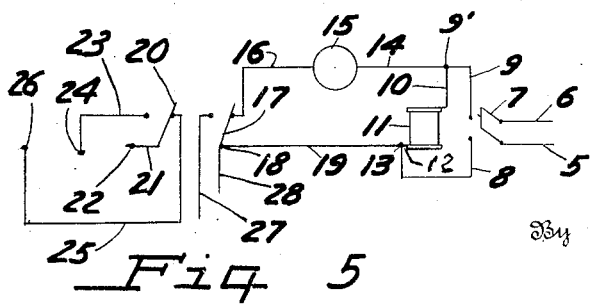
William J. Wickless
Inventor
By
Attorney Patented Nov. 22, 1949

2,488,842

UNITED STATES PATENT OFFICE 2,488,842

TIME-DELAY RELAY

William J. Wickless, Frederick, Md., assignor to Price Electric Corporation, Frederick, Md., a corporation of Maryland Application July 18, 1946, Serial No. 684,610

3 Claims. (Cl. 318—466)

1

This invention relates to determining a lag or sequence for control, as in electric switch operation.

This invention has utility in responding to a control circuit operation in thereby cutting in a selected time delay mechanism for a succeeding switch operation, with an automatic reset therefor. The unit is thus effective to re-establish the set of conditions prevailing at the time of the control circuit functioning for repetitive operation upon a following control circuit being established.

Referring to the drawings:

Fig. 1 is a plan view of an embodiment of the unit, part of the housing being broken away to show features of the lag-effecting transmission and coacting parts therefor;

Fig. 2 is a fragmentary end elevation of features of the transmission of Fig. 1;

Fig. 3 is a side view of portions of the transmission from the right of Fig. 1, and on a larger scale;

Fig. 4 is a still more enlarged partial view of further details of the transmission of Fig. 2; and Fig. 5 is a wiring diagram of the electrical features with which the transmission operates, showing the microswitches in normal non-operated position.

The unit of this invention is mounted upon an insulation base 1, enveloped by a housing 2 assembled thereon by a screw 3 rising from a post 4 anchored with the base 1.

A control may be 60 cycle alternating current of 110 volts having current supply lines 5, 6 (Fig. 5), to a switch 7, which as thrown in to lines 8, 9, may start the functioning of the unit of this disclosure.

The electric circuit

The line 9 extends to a terminal 9'. From the terminal 9' there extends a conductor line 10 to a clutch operating electro-magnet coil 11. In completing the circuit for this coil 11, there is a line 12 to a terminal 13 to which the line 8 extends.

From the terminal 9', a line 14 extends to a synchronous motor 15, the circuit from which is completed by a line 16 therefrom to a microswitch 17, normally closed. When the switch 17 is closed, a circuit is completed from its terminal 18 and a line 19 to the terminal 13.

In the preferred sequence of control, the switch 17 is opened after a control microswitch 20, from which extends a line 21 to a terminal 22, a line 23 to a terminal 24, and a line 25 to a terminal

2

26. Each of these microswitches is accordingly wired in to open one circuit and close another. One of the controls from the switch 17 may be by way of lines 27, 28. As to the motor 15, the switch 17 may be considered as normally closed and as not directly affecting the coil 11. Closing of the normally open switch 7 starts the motor 15, and energizes the coil 11 as long as the switch 17 remains closed.

The transmission

From the motor 15 there is a speed reduction gearing 29 (Figs. 1, 3) for slow speed rotation of a pinion 30. Axially parallel therewith is a gear 31 loosely mounted on a shaft 32. Clockwise rotation of the gear 31 on the shaft 32 from the microswitch side looking toward the motor, is yieldably resisted by a torsion spring 33 engaging the gear 31 and a frame member 34 mounted by screws 35 as it extends upward from the base 1.

Openings 36 in the gear 31 provide range for locating screw 37 mounting insulation sleeves 38. As herein shown, similar screws 37, 39 (Fig. 4), are located diametrically or about 180° apart. This means that in the recovery or counter clockwise rotation of the gear 31 as a result of the unwinding of the spring 33, the sleeve on the screw 39 rides against a spring arm 40 as a stop.

The clutch

The tooth pitch for the pinion 30 and the gear 31 are of such similarity that at a common tangent position therefor, a long pinion 41 (Figs. 2, 3) mounted on a lever 42, and swung thereto-ward effects simultaneous meshing relation therewith in providing a toothed coupling for the transmission, whereby the slow speed transmission thru the gearing 29 with the additional reduction thru the gear 31 may be in the range of say 3 minutes for turning the gear 31 about 120°.

The throwing in of the control switch 7 energizes the coil 11. A core 43 (Fig. 2) acts upon an armature arm 44 of the lever 42 to tilt the lever on its fulcrum notched-in ears 45 as overhanging from upstanding leg 46 of a mounting plate 47 for the coil 11 on the base 1. A tension helical spring 48 from the base 1 engages the lever 42 arm as toward the long clutch pinion 41 normally holding the pinion 41 out of mesh relation, and the armature 44 spaced from the core 43. Under the requirements for complete operation, there is obtained sufficient hold-in interval for the switch 7, or thru connections from the switch 20, that the coil 11 be energized for the selected travel arc operation of the gear 31 as to its screw or pin 37.

The delayed switch operation

A frame member 49 having screw connection 50 (Fig. 1) with the base 1, provides a mounting for the gearing 29. Spacer 51 therefrom to the member 34 is parallel to the shaft 32 between the members 49, 34. Above the shaft 32 and parallel thereto in the members 49, 34, is a rocker shaft 52, adjacent the gear 31 on the side thereof from which the pins 37, 39, project, is a depending arm 53. A set screw 54 anchors a parallelogram shaped block or cam 55 (Figs. 1, 3, 4) on the shaft 52 as extending between the microswitches 17, 20. Leaf spring arms 56, 57, upwardly extending from the switches 17, 20, yieldably tend normally to keep the parallel faces of the block 55 vertical and the arm 53 similarly directed adjacent the gear 31.

The leaf spring 56 in its flexing controls the microswitch 17. Opposite thereto, the leaf spring 57 acts upon the microswitch 20. For the preferred sequence of control operations hereunder, the flexing of the arm 53 is set to determine the control external of the unit or device before the arm 56 acts thru the switch 17 to cut out the motor 15.

The coil 11 with its energized core 43 is an electromagnet actuator for the armature or lever 44, against the action of a spring 48. The spring 48 normally holds the lever 42, 44, tilted with the arm 44 against a stop 58 (Figs. 2, 4) on a bracket arm 59 from the frame 34. Structurally, the down arm 58 as the stop is an angular extension from the stop arm 40 for the gear 31.

The arm 40 limits the recovery action of the gear 31, as the driving power for the motor 15 is off and the coil 11 be de-energized. This reset for the switch operating extension from the transmission is brought about by the spring arms 56, 57, action upon the cam 55 to swing it into vertical position for minimum spacing between the arms 56, 57. The arc for actual shifting of the arm 53 by the crank pin 37 is but a few degrees—possibly less than 10°. From this it follows that the time lapse therefor may be selected by the idle position or arc spacing of the pin 37 away from the pin 39 as beyond 90°, in the motor actuated clockwise rotation of the gear 31 (Fig. 4). While the spring arms 56, 57, reset the rocker shaft arm 53 as the crank pin 37 is clear thereof, the torsion spring 33, swings the gear 31 to its stop position with the pin 39 at the arm 40.

De-energizing of the coil 11, has response at once, for the spring 48 pulls the shiftable connector or clutch transmission pinion 41 away from its transmission relation in assembling the independent gearings of the transmission. The motor 15 completes its control operation when it opens the switch 20. Thereafter, by opening its own switch 17, there is avoided any occasion to stall the motor 15.

What is claimed and it is desired to secure by Letters Patent is:

1. An electric motor, an electromagnet coil, electric current supply therefor, circuit means placing the motor and coil in parallel, a first switch for connecting in the current supply for simultaneously energizing the coil and motor, a second switch in the motor circuit openable to de-energize the motor independently of the coil, a speed reduction gearing from the motor, additional independent gearing means having an initial start position of rest, a reset device for the gearing means to said start position of rest, selectable control means movable with the gearing means, a circuit to be controlled, a third switch for the circuit to be controlled, mounting means locating the second and third switch in opposing proximity, a cam between the second and third switches, gearing interconnection means adapted to be thrown into transmission relation by the coil upon closing of the first switch and thereby connecting the motor to shift the gearing from the start position of rest, and actuating connection means between the control means and the second and third switches including said cam and coacting to operate the third switch in advance of opening the second switch, whereby the motor is deenergized after the control operation, and opening of the first switch de-energizes the coil to release the gearing interconnection means for the reset device to bring the gearing means to its start position of rest.

2. A circuit to be controlled, first and second switches therefor, a pair of spring arms, one for each switch, a shaft extending between the arms, a cam on the shaft, interconnectable motor and transmission mechanism providing a one direction drive to rock the shaft to shift the cam, said cam being configured in dimension first to engage and flex one of the spring arms to operate the first switch and in sequence thereafter said arm having a different dimension then to engage and flex the other arm sufficiently to operate the second switch, and control resetting means clearing the cam from spring arm actuating position, whereby the arms come to normal inactive position for a subsequent similar cycle of operation.

3. Plural switch means, a pair of spring arms therefrom, a cam between the arms, a rock shaft mounting the cam, a radial arm extending from the rock shaft, an angularly shiftable control disk having an idle starting position, means mounting the disk axially parallel to the rock shaft, selectively positioning pin means mounted in the disk for movement therewith, a clutch between the disk and motor for moving the disk for the pin means to act on the radial arm to rock the shaft and the cam therewith to flex the spring arms and actuate the plural switch means, a throw-out for the clutch to release the disk, a torsion spring for reversely rocking the disk from the direction of the motor drive therefor, thereby to release the spring arms from flexing by the cam, and a stop for the disk at said idle starting position in completing a cycle of operation.

WILLIAM J. WICKLESS.

REFERENCES CITED

The following references are of record in the file of this patent:

UNITED STATES PATENTS

| Number | Name | Date |
| --- | --- | --- |
| 1,108,886 | Conrad | Sept. 1, 1914 |
| 1,325,235 | Craighead | Dec. 16, 1919 |
| 1,829,610 | Runner | Oct. 27, 1931 |
| 2,199,184 | Mohr | Apr. 30, 1940 |
| 2,395,669 | Kelly | Feb. 26, 1946 |
| 2,430,286 | Flegel | Nov. 4, 1947 |